United States Patent Office 3,288,736
Patented Nov. 29, 1966

3,288,736
COATING COMPOSITIONS COMPRISING PARTIAL FATTY ACID ESTERS OF HYDROXYL INTERPOLYMERS
Howard J. Wright and Richard D. Kincheloe, Kansas City, Mo., assignors to Cook Paint & Varnish Company, Kansas City, Mo., a corporation of Delaware
No Drawing. Filed Nov. 15, 1962, Ser. No. 238,038
9 Claims. (Cl. 260—23)

The present invention relates to certain novel resinous compositions which are suitable for use as the film-forming vehicle in paints or like compositions.

Broadly stated, the compositions of the invention comprise the oil acid esterification product of a vinyl copolymer of (1) at least one hydroxy-free ethylenically unsaturated monomer and (2) a hydroxy ethylenically unsaturated monomer. Typically suitable hydroxy-free ethylenically unsaturated compounds are vinyl hydrocarbons such as styrene, α-methyl styrene and other lower alkyl styrenes, and vinyl toluene; the lower alkyl esters of the alpha,beta-unsaturated carboxylic acids, e.g. methyl methacrylate, butyl methacrylate, methyl acrylate, ethyl acrylate, butyl acrylate; and vinyl acetate. These monomers may be used individually but especially good results are obtained if mixtures of two such monomers or more are used, particularly a mixture of vinyl hydrocarbon such as styrene and a lower alkyl ester like methyl methacrylate. Normally, when such mixtures are used, the mixture will comprise from 1 to 2 parts by weight of the vinyl hydrocarbon per part of lower alkyl ester although it will be recognized that other ratios may also be used.

The hydroxy ethylenically unsaturated monomer used herein may be a lower hydroxy alkyl acrylate or methacrylate such as 2-hydroxy ethyl acrylate, 2-hydroxy propyl acrylate, 4-hydroxy butyl acrylate and the corresponding methacrylate derivative or a polymethylol alkane vinyl ether, e.g. trimethylol propane monoallyl ether or pentaerythritol monoallyl ether.

The copolymerization reaction may be facilitated by using a suitable polymerization catalyst, e.g. a peroxide catalyst such as ditertiary butyl peroxide, cumene hydroperoxide, benzoyl peroxide or other free-radical type catalysts, such as azobisisobutyronitrile.

An appropriate molecular weight regulator, e.g. an organic thiol such as lauryl mercaptan, may also be used during the copolymerization in order to obtain an optimum molecular weight for the polymer. Usually, the molecular weight of the polymer will be such that the viscosity (Gardner-Holdt) is within the range of V to $Z_2$ in 1:1 Cellosolve acetate and xylene at 50% nonvolatile.

The oil acids used herein for esterification of the copolymer may be of the drying or non-drying types, for example, linseed oil, soya oil, tall oil, dehydrated castor oil, safflower oil and/or coco oil fatty acids. Usually, the acids will be used in an amount comprising from 10 to 55% by weight based on the total weight of copolymer and oil acids. However, the actual amount of oil acid utilized in any particular case will depend on the desired end use of the product. For air drying systems which are useful in architectural applications and soluble in low solvency thinners such as naphtha, it is preferred to stay in the range of 40–55% by weight fatty acid content. On the other hand, for industrial uses or varnishes, the fatty acid content may be somewhat lower, e.g. in the range of 10–35% by weight. It will be appreciated that the copolymer subjected to esterification should include sufficient hydroxy groups to react with all of the oil acid and it is preferred to have a little excess of hydroxy groups over and above that required for the esterification to aid in reducing the acid number. Usually the acid number of the final oil acid esterification product should be of the order of 20 or below. In the case of non-drying systems, i.e. systems which must be baked to effect cure, it is desirable to have enough excess of the hydroxy alkyl to give an esterified product which has a hydroxyl number of 50–90. This gives a product of improved compatability with melamine resins. For air drying purposes, the hydroxyl number will preferably be in the range of 10–20. It will be seen from this that the ratio of hydroxy-free ethylenically unsaturated component and hydroxy ethylenically unsaturated component in the copolymer subjected to esterification can be widely varied and will depend on the reactants involved and the anticipated end uses.

The esterification of the copolymer with the oil acid can be carried out in any convenient fashion, e.g. by adding the acid to the copolymer at an elevated temperature such as 200–250° C. while removing the water formed in the esterification. The reaction is continued until the acid number is reduced below 20 (hydroxyl number preferably between 10–90) after which time the resulting resin may be diluted with appropriate solvent such as xylene and used as a paint vehicle to which any of the conventional ingredients for coating compositions, e.g. fillers, pigments, etc. may be added. If a drying oil acid is used for the esterification, the resinous vehicle will dry rapidly in air (20–25° C.) to give excellent hard, flexible water-resistant films. On the other hand, if a non-drying oil acid is used in the esterification, the esterification product when baked with melamine or urea resins at temperatures of the order of 125–175° C. for 30 to 5 minutes will give hard, flexible, highly resistant and otherwise satisfactory films.

Coating solutions contemplated herein may include conventional air-drying catalysts, such as cobalt naphthenate, lead naphthenate and like driers. Usually, sufficient drier is used to give 1–3% by weight thereof in the coating formulation.

The invention is illustrated but not limited by the following examples wherein parts and percentages, unless otherwise indicated, are on a weight basis.

EXAMPLE 1

| Material: | Parts |
|---|---|
| Tall oil fatty acid | 35.0 |
| Hydroxy propyl methacrylate | 25.1 |
| Methyl methacrylate | 30.0 |
| Styrene | 5.9 |
| Di-tert. butyl peroxide | 3.0 |
| Lauryl mercaptan | 1.0 |
| | 100.0 |

*Copolymer preparation*

400 parts xylene and 400 parts Cellosolve acetate were added to a 3 liter three-necked flask fitted with a reflux condenser, agitator, thermometer and dropping funnel. The mixture was heated to 140° C. or reflux. 502 parts hydroxy propyl methacrylate, 118 parts styrene, 600 parts methyl methacrylate, 60 parts di-tert.butyl peroxide and 20 parts lauryl mercaptan were premixed and added dropwise to the flask over a period of 3 hours. The contents were held at reflux for 3 hours or until the monomers had been converted. The xylene and Cellosolve acetate were stripped off under reduced pressure and a temperature of 180° C.

Esterification of copolymer

After the abovementioned stripping operation, 700 parts of tall oil fatty acid were added to the copolymer and heated to 210°–220° C. An inert gas sparge was used to aid in removal of water formed in the esterification and to produce light colored materials. The reactants were held until the acid number had been reduced to below 20 at which time the resin was reduced in xylene.

The resulting resin/xylene solution had a Gardner-Holdt viscosity of $Z_1$ at 60% non-volatile. Films cast on a glass plate from a solution containing .05% cobalt and 0.5% lead air dried into hard and otherwise desirable films in 1.5 hours.

EXAMPLE 2

| Material: | Parts |
|---|---|
| Soya fatty acid | 45.0 |
| Hydroxy propyl methacrylate | 28.5 |
| Methyl methacrylate | 15.0 |
| Styrene | 7.5 |
| Di-tert.butyl peroxide | 3.0 |
| Lauryl mercaptan | 1.0 |
| | 100.0 |

The copolymerization and esterification reactions were repeated as in Example 1.

The resin when reduced in mineral spirits had a Gardner-Holdt viscosity of $Z_1$ at 50% non-volatile. Films cast from solutions containing 0.05% cobalt and 0.5% lead air dried in 10 hours with good flexibility and solvent resistance.

EXAMPLE 3

| Material: | Parts |
|---|---|
| Coconut fatty acids | 25 |
| Hydroxy propyl methacrylate | 27 |
| Methyl methacrylate | 38 |
| Styrene | 6 |
| Di-tert.butyl peroxide | 3 |
| Lauryl mercaptan | 1 |
| | 100 |

The copolymerization and esterification procedures were again repeated as in Example 1 above.

The resin was reduced in xylene and had a Gardner-Holdt viscosity of X at 50% non-volatile. Eighty parts of the oil-copolymer system were blended with twenty parts of a melamine-formaldehyde resin. Films cast on glass plate and baked 30 minutes at 250° F., were hard and flexible and had good solvent resistance.

EXAMPLE 4

The process of Example 3 was repeated except that the melamine-formaldehyde resin was replaced by urea-formaldehyde resin and the film baked for 30 minutes at 300° F. with essentially the same results.

EXAMPLE 5

| Material: | Parts |
|---|---|
| Tall oil fatty acid | 55.0 |
| Hydroxyethyl methacrylate | 27.5 |
| Styrene | 9.2 |
| Methyl methacrylate | 4.3 |
| Lauryl mercaptan | 1.0 |
| Di-tert.butyl peroxide | 3.0 |

The copolymerization and esterification procedures were again repeated as in Example 1. The resulting product was reduced in mineral spirits and had a Gardner-Holdt viscosity of T–V at 50% non-volatile and an acid number of 12. Outstanding films were obtained with this solution by air-drying for 9–10 hours using 0.05% cobalt and 0.5% lead.

EXAMPLE 6

The copolymerization and esterification procedures of Example 1 were repeated using the following.

| Material: | Parts |
|---|---|
| Tall oil fatty acid | 35 |
| Styrene | 43.5 |
| Hydroxyethyl methacrylate | 17.5 |
| Di-tert.butyl peroxide | 3.0 |
| Lauryl mercaptan | 1.0 |

The esterification product was reduced in naphtha and had a Gardner-Holdt viscosity of H at 50% non-volatile and an acid number of 14. Highly desirable films were obtained therefrom by air drying for 3 hours, using 0.05% cobalt and 0.5% lead.

EXAMPLE 7

The copolymerization and esterification of Example 1 were repeated using the following materials.

| Material: | Parts |
|---|---|
| Tall oil fatty acid | 25.0 |
| Hydroxyethyl methacrylate | 12.5 |
| Methyl methacrylate | 58.5 |
| Di-tert.butyl peroxide | 3.0 |
| Lauryl mercaptan | 1.0 |

The esterification product was reduced in a mixture of equal parts xylene and Cellosolve acetate and showed a Gardner-Holdt viscosity of V at 50% non-volatile, color number 2–3 (Gardner-Holdt) and acid number of 20. Using 0.05% cobalt and 0.5% lead, excellent results were obtained by air drying for 20 minutes.

EXAMPLE 8

Example 1 was repeated using the following:

| Materials: | Parts |
|---|---|
| Hydroxyl propyl methacrylate | 30.7 |
| Styrene | 5.0 |
| Methyl methacrylate | 10.3 |
| Lauryl mercaptan | 1.0 |
| Di-tert, butyl peroxide | 3.0 |
| Linseed fatty acid | 25.0 |
| Soya fatty acid | 25.0 |

The esterification product reduced in mineral spirits had a Gardner-Holdt viscosity of Y at 60% non-volatile and an acid number of 15. Coatings of this composition, including 0.05% cobalt and 0.5% lead, were air dried overnight to give flexible, water resistant films particularly desirable for architectural paints.

While the invention has been described above with respect to both air-drying and non-drying systems, it should be noted that the invention is of especial significance and importance in the case of the air-drying systems since the latter give effectively crosslinked acrylic-based films without the necessity of baking. All other commercially available acrylic systems which are presently known in the art require baking to give an effective crosslinked film.

It will be recognized that various modifications may be made in the invention described herein without deviating from the scope thereof as set forth in the following claims wherein

We claim:

1. The composition which comprises the oil fatty acid esterification product of a vinyl copolymer of (1) at least one hydroxy-free ethylenically unsaturated monomer selected from the group consisting of vinyl aromatic hydrocarbons, lower alkyl esters of acrylic and methacrylic acid and vinyl acetate and (2) a hydroxy ethylenically unsaturated monomer, selected from the group consisting of lower hydroxy alkyl acrylates and methacrylates, polymethylol lower alkane vinyl ethers and pentaerythritol monoallyl ether, the monomer ratios and degree of esterification being such that said esterification product has an acid number below 20 and a hydroxyl number of from 10–90.

2. The composition of claim 1 wherein said oil acid is selected from the group consisting of linseed oil, soya oil, tall oil, dehydrated castor oil, safflower oil and coco fatty acids.

3. The composition of claim 2 wherein said hydroxy-free component comprises a mixture of vinyl aromatic hydrocarbon and lower alkyl ester of acrylic or methacrylic acid.

4. The composition of claim 1 wherein said oil acid is one of the air drying type.

5. The composition of claim 1 wherein said oil acid is one of the non-drying type.

6. The coating process which comprises applying the composition of claim 4 to a surface and allowing the same to air dry.

7. The coating process which comprises applying the composition of claim 1 wherein said oil acid is of the non-air drying type to a surface and baking the same.

8. The drying oil acid esterification product of a polymer of styrene, methyl methacrylate and hydroxy propyl methacrylate, said product having an acid number below 20 and a hydroxy number between 10 and 20.

9. The product of claim 8 wherein said drying oil acid is tall oil fatty acid.

References Cited by the Examiner

UNITED STATES PATENTS

| | | | |
|---|---|---|---|
| 2,378,827 | 6/1945 | Bradley | 260—23 |
| 2,588,890 | 3/1952 | Shokal et al. | 260—23 |
| 2,596,737 | 5/1952 | Tess et al. | 260—23 |
| 2,681,897 | 6/1954 | Frazier et al. | 260—80.5 |
| 2,850,480 | 9/1958 | D'Alelio | 260—23 |
| 2,897,174 | 7/1959 | Chapin et al. | 260—23 |
| 3,069,399 | 12/1962 | Abramo et al. | 260—23 |
| 3,082,184 | 3/1963 | Falgiatore et al. | 260—30.4 |
| 3,230,204 | 1/1966 | Chloupek et al. | 260—23 |
| 3,234,157 | 2/1966 | Schefbauer | 260—23 |

LEON J. BERCOVITZ, *Primary Examiner.*

R. A. WHITE, *Assistant Examiner.*